United States Patent
Miao et al.

(10) Patent No.: US 11,721,062 B2
(45) Date of Patent: Aug. 8, 2023

(54) METHOD FOR PROCESSING IMAGES, NEAR-EYE DISPLAY DEVICE, COMPUTER DEVICE, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Jinghua Miao, Beijing (CN); Xuefeng Wang, Beijing (CN); Qingwen Fan, Beijing (CN); Shuai Hao, Beijing (CN); Zihe Liu, Beijing (CN); Wenyu Li, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/641,616

(22) PCT Filed: Apr. 8, 2021

(86) PCT No.: PCT/CN2021/085964
§ 371 (c)(1),
(2) Date: Mar. 9, 2022

(87) PCT Pub. No.: WO2021/238423
PCT Pub. Date: Dec. 2, 2021

(65) Prior Publication Data
US 2022/0358711 A1    Nov. 10, 2022

(30) Foreign Application Priority Data
May 29, 2020    (CN) .......................... 202010477623.3

(51) Int. Cl.
*G06T 15/10* (2011.01)
*H04N 13/383* (2018.01)
*H04N 13/302* (2018.01)

(52) U.S. Cl.
CPC .......... *G06T 15/10* (2013.01); *H04N 13/383* (2018.05); *H04N 13/302* (2018.05)

(58) Field of Classification Search
CPC .. H04N 13/327; H04N 13/383; H04N 13/344; H04N 13/302; G06T 15/005; G06T 15/10; G06F 3/011; G02B 27/017
See application file for complete search history.

(56) References Cited

U.S. PATENT DOCUMENTS

2013/0308018 A1    11/2013   Sasaki
2018/0031848 A1    2/2018    Huang et al.
(Continued)

FOREIGN PATENT DOCUMENTS

CN    105866949 A    8/2016
CN    107682690 A    2/2018
(Continued)

OTHER PUBLICATIONS

CN202010477623.3 Notification to Grant Patent Right for Invention.

*Primary Examiner* — Phi Hoang
(74) *Attorney, Agent, or Firm* — IPro, PLLC

(57) ABSTRACT

Provides a method for processing images. The method includes: acquiring an object-image relationship to which both a pupillary distance value of a near-eye display device and an object distance of the near-eye display device correspond, wherein the object-image relationship comprises a correspondence between coordinates of a locating point on a screen and coordinates of a field of view of an image point displayed at the locating point; performing anti-distortion processing on a to-be-displayed picture based on the object- (Continued)

image relationship; and outputting a picture acquired after the anti-distortion processing.

20 Claims, 14 Drawing Sheets

(56) References Cited

U.S. PATENT DOCUMENTS

| | | |
|---|---|---|
| 2019/0121428 A1 | 4/2019 | Chen et al. |
| 2019/0384378 A1* | 12/2019 | Ebert .................. G02B 27/0176 |
| 2020/0041799 A1* | 2/2020 | Zhu .................... G02B 27/0093 |
| 2021/0199964 A1* | 7/2021 | Atkinson ............. H04N 13/139 |
| 2021/0274200 A1* | 9/2021 | Cismas ................ H04N 19/37 |
| 2021/0281638 A1* | 9/2021 | Vrcelj ................. H04L 43/0882 |
| 2021/0334943 A1 | 10/2021 | Chu et al. |

FOREIGN PATENT DOCUMENTS

| | | |
|---|---|---|
| CN | 108090880 A | 5/2018 |
| CN | 108267299 A | 7/2018 |
| CN | 108287678 A | 7/2018 |
| CN | 109040736 A | 12/2018 |
| CN | 109461213 A | 3/2019 |
| CN | 109741294 A | 5/2019 |
| CN | 110544209 A | 12/2019 |
| CN | 110840721 A | 2/2020 |
| CN | 110858899 A | 3/2020 |
| CN | 111010560 A | 4/2020 |
| CN | 111652959 A | 9/2020 |
| JP | 2013240022 A | 11/2013 |
| WO | 2019169908 A1 | 9/2019 |

* cited by examiner

METHOD FOR PROCESSING IMAGES, NEAR-EYE DISPLAY DEVICE, COMPUTER DEVICE, AND STORAGE MEDIUM

CROSS-REFERENCE TO RELATED APPLICATION

The present disclosure is a U.S. national phase application based on PCT/CN2021/085964, filed on Apr. 8, 2021, which is based on and claims priority to the Chinese Patent Application No. 202010477623.3, filed on May 29, 2020 and entitled "METHOD FOR PROCESSING IMAGES, NEAR-EYE DISPLAY DEVICE, COMPUTER DEVICE, AND STORAGE MEDIUM," all of which are hereby incorporated by reference in their entireties for all purposes.

TECHNICAL FIELD

The present disclosure relates to the field of display technologies, and in particular, to a method for processing images, a near-eye display device, a computer device, and a storage medium.

BACKGROUND

A visual training instrument can prompt a user to constantly adjust a ciliary muscle by adjusting a distance from a displayed picture to the user, thereby exercising the ciliary muscle, and further correcting pseudo myopia. For the user, the distance from the displayed picture to the user is equivalent to an image distance. The image distance can be adjusted by adjusting an object distance of the visual training instrument, namely, a distance between a screen and the user, thereby adjusting the distance from the displayed picture.

SUMMARY

Embodiments of the present disclosure provide a method for processing images, a near-eye display device, a computer device, and a storage medium. The technical solutions are as follows.

According to an aspect, a method for processing images is provided. The method includes:

acquiring an object-image relationship to which both a pupillary distance value of a near-eye display device and an object distance of the near-eye display device correspond, wherein the object-image relationship includes a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen;

performing anti-distortion processing on a to-be-displayed picture based on the object-image relationship; and outputting a picture acquired after the anti-distortion processing.

Optionally, acquiring the object-image relationship to which both the pupillary distance value of the near-eye display device and the object distance of the near-eye display device correspond includes:

in the case that the pupillary distance value changes, determining, based on a correspondence, an object-image relationship to which a changed pupillary distance value and the object distance of the near-eye display device correspond, wherein the correspondence is a correspondence among a pupillary distance, an object distance, and an object-image relationship; in the correspondence, one pupillary distance corresponds to one group of object-image relationships; and the group of object-image relationships includes a plurality of object-image relationships corresponding to different object distances; or in the case that the pupillary distance value does not change, selecting an object-image relationship corresponding to the object distance of the near-eye display device from a group of object-image relationships that is used last time.

Optionally, the method further includes:

acquiring a pupillary distance change flag, wherein the pupillary distance change flag is configured to indicate whether the pupillary distance value changes.

Optionally, acquiring the pupillary distance change flag includes:

acquiring, before each frame of the picture is displayed, the pupillary distance change flag.

Optionally, determining, based on the correspondence, the object-image relationship to which the changed pupillary distance value and the object distance of the near-eye display device correspond includes:

determining, based on the pupillary distance value, a group of object-image relationships corresponding to the pupillary distance value; and selecting an object-image relationship corresponding to the object distance of the near-eye display device from the group of object-image relationships.

Optionally, the method further includes:

periodically acquiring the pupillary distance value; and setting a pupillary distance change flag based on a pupillary distance value acquired this time and a pupillary distance value acquired last time.

Optionally, acquiring the pupillary distance value each time in a process of periodically acquiring the pupillary distance value includes:

sequentially displaying a plurality of 3D pictures to a user, wherein the plurality of 3D pictures are 3D pictures applicable to different pupillary distance values;

receiving a target picture indication input by the user based on the plurality of 3D pictures; and determining, based on a target 3D picture corresponding to the target picture indication, a pupillary distance value corresponding to the target 3D picture.

Optionally, acquiring the pupillary distance value each time in a process of periodically acquiring the pupillary distance value includes:

acquiring the pupillary distance value measured by a pupillary distance measuring instrument.

Optionally, the method further includes:

acquiring the pupillary distance value after receiving a wake-up instruction; and setting a pupillary distance change flag based on a pupillary distance value acquired this time and a pupillary distance value acquired last time.

Optionally, performing the anti-distortion processing on the to-be-displayed picture based on the object-image relationship includes:

determining an anti-distortion algorithm based on the pupillary distance value; and performing the anti-distortion processing on the to-be-displayed picture by using the object-image relationship as an input parameter of the anti-distortion algorithm.

Optionally, before performing the anti-distortion processing on the to-be-displayed picture based on the object-image relationship, the method further includes:

determining a rendering resolution;

acquiring user pose information; and acquiring the to-be-displayed picture by performing 3D picture rendering according to the rendering resolution based on the user pose information.

Optionally, the method further includes:

acquiring a correspondence among a pupillary distance, an object distance, and an object-image relationship; and storing the correspondence into a storage unit of the near-eye display device.

Optionally, acquiring the correspondence among the pupillary distance, the object distance, and the object-image relationship includes:

acquiring the correspondence among the pupillary distance, the object distance, and the object-image relationship by respectively determining, for different pupillary distances and object distances, the correspondence between the coordinates of the locating point on the screen and the coordinates of the field of view of the image point displayed at the locating point.

Optionally, the near-eye display device is a visual training instrument.

According to an aspect, an apparatus for processing images is provided. The apparatus includes:

an acquiring module, configured to acquire an object-image relationship to which both a pupillary distance value of a near-eye display device and an object distance of the near-eye display device correspond, wherein the object-image relationship includes a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen;

a processing module, configured to perform anti-distortion processing on a to-be-displayed picture based on the object-image relationship; and an outputting module, configured to output a picture acquired after the anti-distortion processing.

According to an aspect, a near-eye display device is provided. The near-eye display device includes:

a memory, configured to store a computer program;

a processor, configured to execute the computer program stored in the memory, to perform any one of the foregoing methods for processing images;

a display, configured to display a picture output by the processor and acquired after the anti-distortion processing; and a lens, disposed on a side where a light-emitting surface of the display is located and opposite to the display.

According to an aspect, a computer device is provided. The computer device includes a processor and a memory, wherein the memory is configured to store a computer program; and the processor is configured to execute the computer program stored in the memory, to perform any one of the foregoing methods for processing images.

According to an aspect, a computer-readable storage medium is provided. The computer-readable storage medium stores a computer instruction therein, wherein the computer instruction, when executed by a processor, causes the processor to perform any one of the foregoing methods for processing images.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

To make the objectives, technical solutions, and advantages of the present disclosure clearer, embodiments of the present disclosure will be described in detail with reference to the accompanying drawings.

In addition to adjusting an object distance, adjusting a pupillary distance is also one of functions of many visual training instruments. Due to the function of adjusting a pupillary distance, the visual training instrument can be applicable to users having different pupillary distances, thereby avoiding an impact on user's physical health condition of a visual training instrument that is inapplicable to the user's pupillary distance.

In a visual training instrument, main factors affecting an image outputting effect are system field of view (FOV) and anti-distortion processing. A system field of view determines which objects are displayed. In the case that system fields of view (hereinafter referred to as fields of view for short) of two eyes are different, content presented to the two eyes is different. Under the action of a binocular parallax, a stereoscopic effect is formed. A field of view depends on a location relationship between a lens and a screen as well as an optical property of the lens. To acquire an accurate field of view, the field of view limited by the lens and an edge of the screen needs to be defined during design of an optical path. An objective of anti-distortion processing is to cancel out a distortion introduced by the lens. In summary, the field of view affects a scene range and a stereoscopic depth that are seen by a user, and the anti-distortion processing affects whether a scene shape seen by the user is normal.

The main structure of a visual training instrument capable of adjusting both an object distance and a pupillary distance includes: screens corresponding to a left eye and a right eye, lenses corresponding to the left eye and the right eye, an object distance adjustment unit for adjusting distances between the lenses and the screens, a pupillary distance adjustment unit for adjusting a distance between the two lenses, and the like. The field of view changes no matter whether the object distance or the pupillary distance changes, and the anti-distortion processing is affected when the field of view changes. Optionally, a structure of the visual training instrument may further include a lens mounting part, a screen mounting part, and the like, such that a dismountable and modularized visual training instrument is realized.

Figure 1:
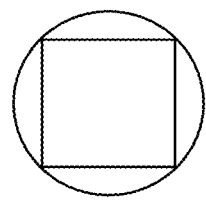
FIG. 1 is a schematic diagram of a relationship between a lens and a screen according to an embodiment of the present disclosure.
Figure 2:
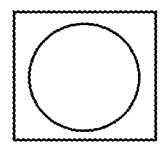
FIG. 2 is a schematic diagram of a relationship between a lens and a screen according to an embodiment of the present disclosure.

The following describes impacts of the object distance and the pupillary distance on the field of view with reference to the accompanying drawings. A system FOV of the visual training instrument is limited by the lenses and edges of the screens. When the lenses are circular aspherical lenses, and the pupillary distance of the visual training instrument is fixed, up FOV1 (up), down FOV1 (down), left FOV1 (left), and right FOV1 (right) of FOV1 (circular regions in FIG. 1 and FIG. 2) limited by the lens of the visual training instrument are the same. In the case that FOV2 (square regions in FIG. 1 and FIG. 2) limited by the edge of the screen is less than FOV1 limited by the lens, as shown in FIG. 1, the user can see a boundary of the screen, which affects a sense of immersion. In the case that FOV2 is larger than FOV1, as shown in FIG. 2, the user has a strong sense of lens barrel, which also affects the sense of immersion. Therefore, to sufficiently use design of a screen and an optical lens, FOV1 is usually designed to be relatively large, and matches a size of the screen, thereby achieving design of an ideal system FOV.

Figure 3:
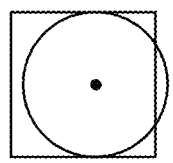
FIG. 3 is a schematic diagram of a relationship between a lens and a screen according to an embodiment of the present disclosure.
Figure 4:
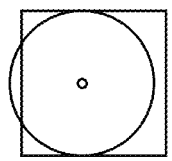
FIG. 4 is a schematic diagram of a relationship between a lens and a screen according to an embodiment of the present disclosure.

Generally, use objects of visual training instruments are teenagers, such that pupillary distance ranges of the visual training instruments are relatively large. However, an inappropriate pupillary distance may affect a physical health condition of a teenager. Therefore, pupillary distances of visual training instruments are generally adjustable. In a pupillary distance-adjustable device, a system FOV is sacrificed to a certain extent. As shown in FIG. 3, when the pupillary distance is smaller than a preset pupillary distance, a center of the lens is biased toward an edge, proximal to the middle of the binocular, of a screen, such that FOV2 (right) of FOV2 limited by the screen becomes smaller. As shown in FIG. 4, when the pupillary distance is larger than the preset pupillary distance, the center of the lens deflects to an edge, distal from the middle of the binocular, of the screen, such that FOV2 (left) of FOV2 limited by the screen becomes smaller.

Figure 5:
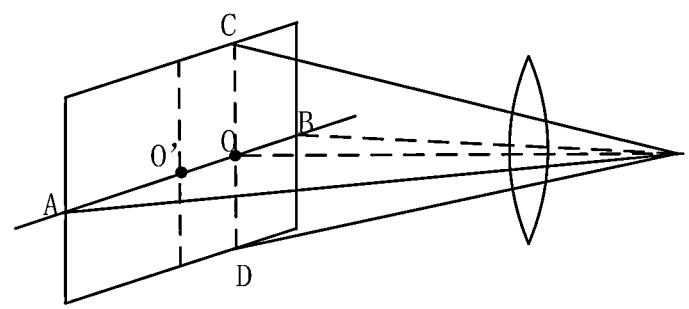
FIG. 5 is a schematic diagram of a field of view according to an embodiment of the present disclosure.
Figure 6:
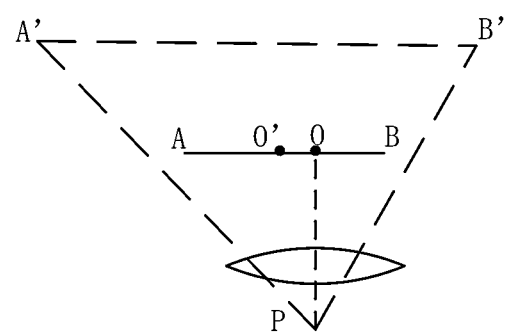
FIG. 6 is a schematic diagram of a field of view according to an embodiment of the present disclosure.

Therefore, the system FOV is affected by the pupillary distance. Referring to FIG. 5 and FIG. 6, point O represents an intersection between a primary optical axis of the lens and the screen; O' represents a center of the screen; A, B, C, and D respectively represent midpoints of four edges of the screen; fields of view corresponding to the four points are a left field of view, a right field of view, an upper field of view, and a lower field of view between the screen and the lens, which are calculated by: FOV (left)=arctan(OA/d), FOV (right)=arctan(OB/d), FOV (up)=arctan(OC/d), and FOV (down)=arctan(OD/d), wherein d represents an object distance, that is, a distance between a human eye and the intersection between the primary optical axis of the lens and the screen. When the pupillary distance is adjusted, a position of point O changes, which affects sizes of the left field of view and the right field of view. In addition, visual training instruments are classified into object distance—fixed visual training instruments and object distance—changeable visual training instruments. The object distance—changeable visual training instruments are compatible with users being myopic to a certain extent. For the object distance—changeable visual training instruments, it can be known from the foregoing field of view calculation manner, the field of view changes along with the object distance.

A change of the field of view is directly reflected in a scene rendering result, which is described below with reference to the accompanying drawings.

Figure 7:
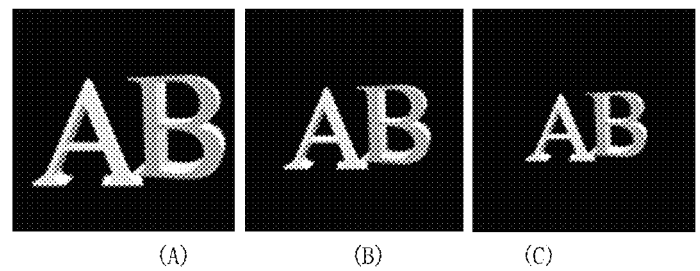
FIG. 7 shows scene rendering effects for different fields of view.

FIG. 7 shows scene rendering effects for different fields of view. As shown in FIG. 7, (A), (B), and (C) respectively show scene rendering effects for fields of view that are 40 degrees, 50 degrees, and 60 degrees. It can be seen that a smaller field of view corresponds to a larger object displayed in a picture.

Figure 8:
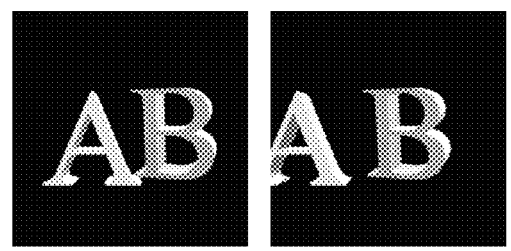
FIG. 8 to FIG. 10 show binocular images on a same image plane for different pupillary distances.
Figure 9:
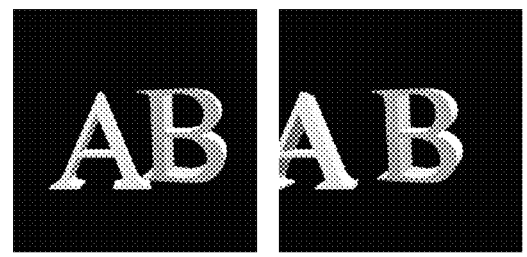
Figure 10:
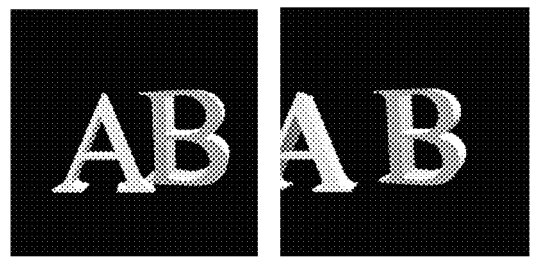
Figure 11:
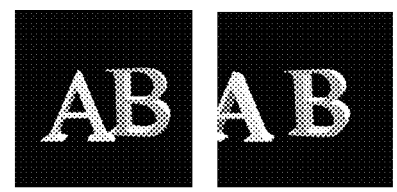
FIG. 11 to FIG. 14 show scene rendering effects for different object distances.
Figure 12:
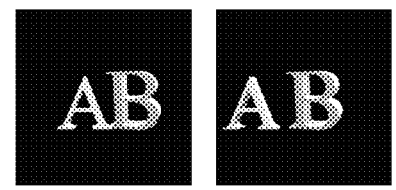
Figure 13:
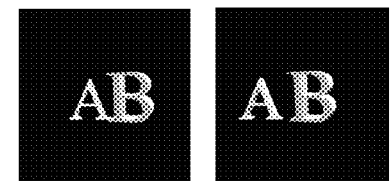
Figure 14:
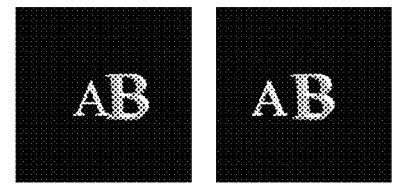

FIG. 8 to FIG. 10 show binocular images on a same image plane (a plane where the images are displayed) for different pupillary distances. FIG. 8, FIG. 9, and FIG. 10 respectively show binocular images for pupillary distances that are 56 mm, 65 mm, and 75 mm. It can be seen that fields of view differ when pupillary distances are different, thereby causing differences between the binocular images.

FIG. 11 to FIG. 14 show scene rendering effects for different object distances. The object distances gradually increase from FIG. 11 to FIG. 14. In pictures, a position relationship between A and B is kept fixed in scenes, and target display resolutions are the same. It can be seen that for different object distances, fields of view are different. When a field of view is large, more scene contents can be displayed. Objects in the pictures comply with a rule that a near object is large while a far object is small.

Because a displayed picture is affected by a pupillary distance and an object distance, during anti-distortion processing, in the case that the pupillary distance and the object distance are not taken into consideration, a picture acquired after the anti-distortion processing may still be abnormal, that is, distortion cannot be completely eliminated.

Figure 15:
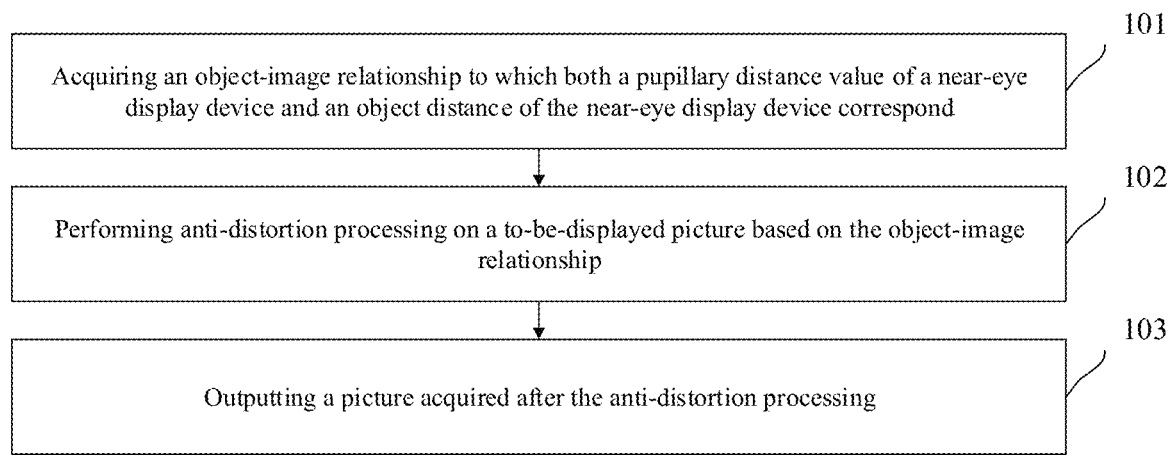
FIG. 15 is a flowchart of a method for processing images according to an embodiment of the present disclosure.

FIG. 15 is a flowchart of a method for processing images according to an embodiment of the present disclosure. The method takes both an object distance and a pupillary distance into consideration during anti-distortion processing, such that accuracy of a picture acquired after the anti-distortion processing can be ensured. Referring to FIG. 15, the method includes the following steps.

In step 101, an object-image relationship to which both a pupillary distance value of a near-eye display device and an object distance of the near-eye display device correspond is acquired.

The object-image relationship includes a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen.

For a rectangular screen, a horizontal axis and a vertical axis of the screen may respectively be two adjacent edges of the screen. For a non-rectangular screen, a horizontal axis and a vertical axis of the screen may also be preset. For example, the horizontal axis of the screen may be an axis in a row direction of pixel units in the screen, the vertical axis may be an axis in a column direction of the pixel units in the screen, or the like.

In this embodiments of the present disclosure, the locating point may be a representative point on the screen, such as a vertex of the screen, a midpoint on each edge of the screen, or an intersection, on the screen, between an edge of the screen and the planar coordinate system using the intersection between the primary optical axis of the lens of the near-eye display device and the screen as the origin. In addition, these points are only examples, and an actual locating point may include more points on the screen.

Exemplarily, the locating point may include intersections, on the screen, between four edges of the screen and the planar coordinate system using the intersection between the primary optical axis of the lens of the near-eye display device and the screen as the origin, that is, points (A, B, C, and D) in FIG. 5. Exemplarily, the locating point may further include other points on the four edges of the screen. Taking point A as an example, referring to FIG. 5, coordinates of point A are (−OA, 0). Referring to FIG. 6, coordinates of a field of view of image point A' displayed at point A are (∠A' PO, 0).

Exemplarily, the near-eye display device may be a virtual reality (VR) device, such as the foregoing visual training instrument or a helmet micro display (HMD) device. Alternatively, the near-eye display device may be an augmented reality (AR) device or a device of another type.

In step 102, anti-distortion processing is performed on a to-be-displayed picture based on the object-image relationship.

Figure 16:
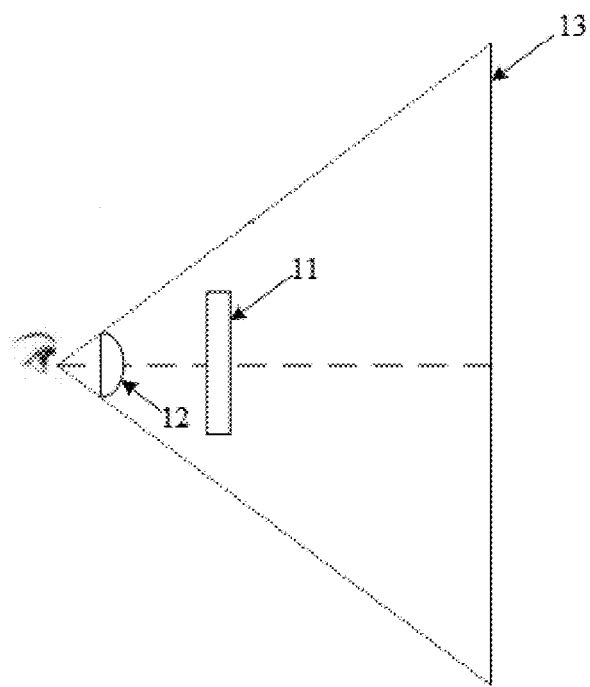
FIG. 16 is a schematic diagram of imaging according to an embodiment of the present disclosure.
Figure 17:
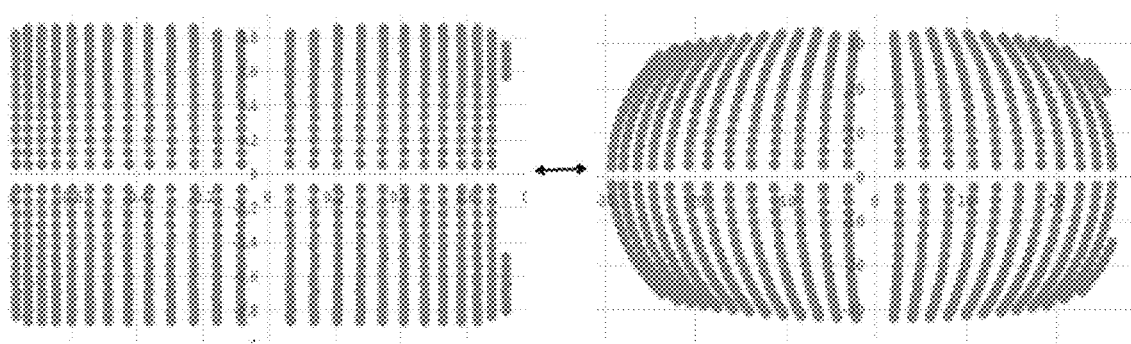
FIG. 17 is a schematic diagram of a correspondence between an image displayed on a screen and a target virtual image presented to a human eye.

In a device based on VR technology, when a lens is approached to an eye of a user, a field of view can be greatly enlarged, but the cost is that an image seems distorted. A larger field of view causes a larger distortion of the image. As shown in FIG. 16, a target virtual image 13 presented to a human eye via a lens 12 is generally an enlarged image of an image displayed in a screen 11 of the near-eye display device. The target virtual image 13 is also distorted in addition to being enlarged. FIG. 17 is a schematic diagram of a correspondence between an image displayed on a screen and a target virtual image presented to a human eye. An image on the left of FIG. 17 is an image displayed on the screen, an image on the right of FIG. 17 is a target virtual image presented to a human eye, and the target virtual image is distorted.

Anti-distortion processing is used to eliminate a distortion introduced by the lens. Taking that the lens is a circular aspherical lens as an example, points equidistant from a center of the lens have the same amount of distortion, that is, an amount of distortion is related to an FOV. A distortion of the lens and the FOV are fixed. However, due to limitation of edges of the screen, FOV2 changes with the pupillary distance, thereby impacting a distortion of an image. Therefore, in a pupillary distance-adjustable system, a pupillary distance value needs to be taken into consideration during anti-distortion processing.

The anti-distortion processing is generally performed by using an anti-distortion algorithm. The anti-distortion algorithm is used for processing an original 3D picture based on the correspondence between the coordinates of the locating point on the screen and the coordinates of the field of view of the image point displayed at the locating point, to change a position of a pixel in the 3D picture. Therefore, the user can see a normal picture when viewing a changed 3D picture.

In step 103, a picture acquired after the anti-distortion processing is output.

Generally, both the pictures in step 102 and step 103 are 3D pictures.

In the technical solutions, an object-image relationship is determined based on two factors, that is, a pupillary distance value and an object distance. The object-image relationship includes a correspondence between coordinates of a locating point on a screen and coordinates of a field of view of an image point displayed at the locating point. And then the object-image relationship is used as a reference for anti-distortion during image processing. Therefore, both the object distance and the pupillary distance are taken into consideration during anti-distortion processing, which ensures accuracy of a displayed picture.

Figure 18:
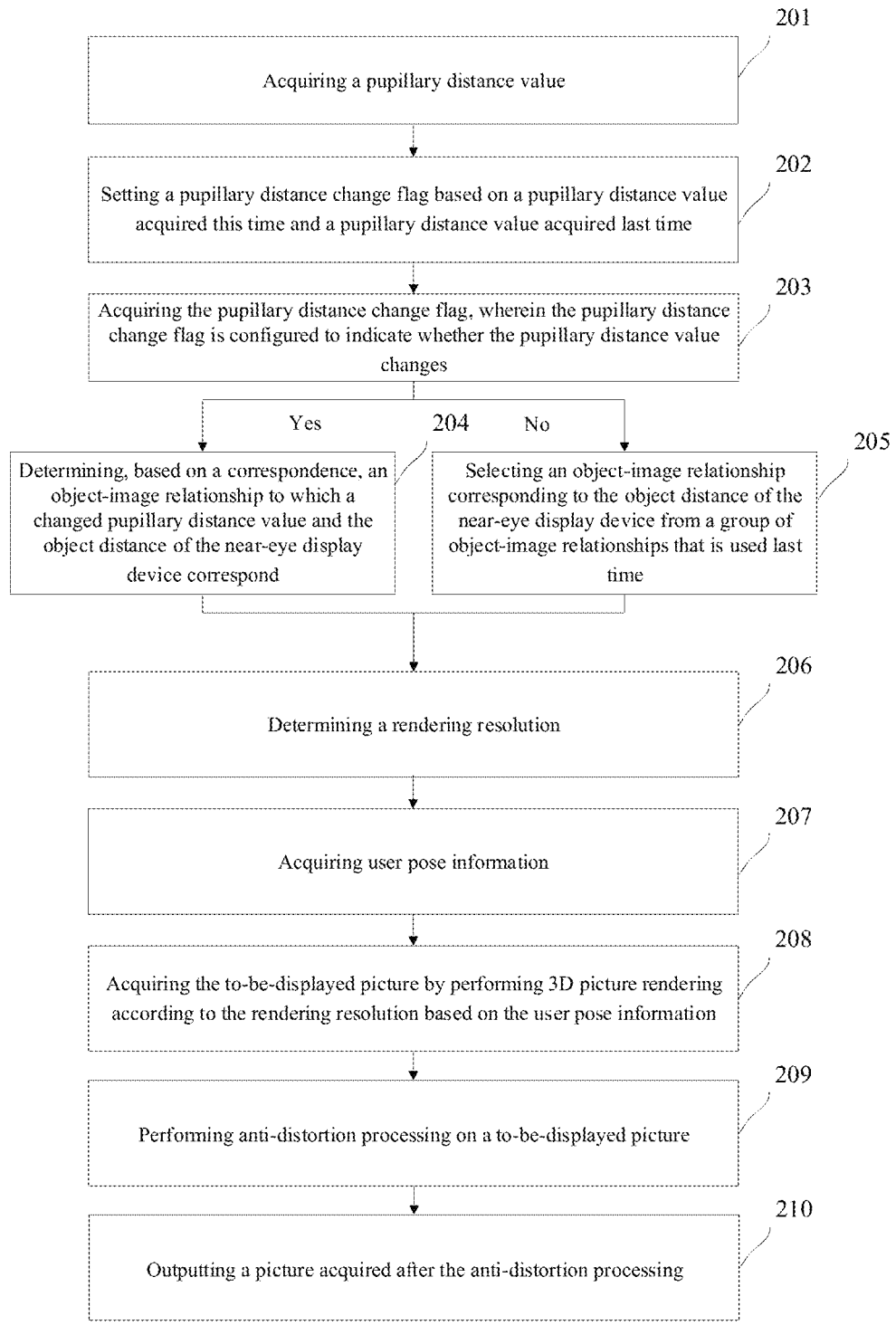
FIG. 18 is a flowchart of a method for processing images according to an embodiment of the present disclosure.

FIG. 18 is a flowchart of a method for processing images according to an embodiment of the present disclosure. The method is applied to a visual training instrument capable of adjusting both a pupillary distance and an object distance, for example, a visual training instrument based on a virtual reality (VR) technology. Referring to FIG. 18, the method includes the following steps.

In step 201, a pupillary distance value is acquired.

In a pupillary distance—adjustable visual training instrument, when the pupillary distance value of the visual training instrument is adjusted, a distance between two lenses of the visual training instrument is changed, thereby affecting a distortion effect of the lenses on a 3D picture. Therefore, the pupillary distance value of the visual training instrument needs to be taken into consideration when anti-distortion processing is performed on the 3D picture.

In this embodiment of the present disclosure, there are the following two manners of acquiring the pupillary distance value:

In a first manner, the pupillary distance value is acquired periodically, that is, a pupillary distance value is acquired at each time interval. The time interval can be set as required.

In a second manner, a wake-up instruction is received, and the pupillary distance value is acquired after the wake-up instruction is received.

A triggering manner of the wake-up instruction may be triggering via a physical button or triggering via a system menu. For example, the wake-up instruction is triggered via a setting button on the visual training instrument.

In this implementation, the pupillary distance value is acquired via the wake-up instruction, that is, the entire method for processing images is woken up. In other words, the method for processing images may be encapsulated into a service built in the visual training instrument, for example, a system service. The system service may be woken up via a user program. A wakeup interface of the service may be encapsulated into an application programming interface (API) and be provided to a developer, thereby flexibly implementing a wakeup mechanism.

In this embodiment of the present disclosure, there may be, but are not limited to, the following two manners of acquiring the pupillary distance value each time:

In a first manner, a plurality of 3D pictures are sequentially displayed to a user, wherein the plurality of 3D pictures are 3D pictures applicable to different pupillary distance values;

a target picture indication input by the user based on the plurality of 3D pictures is received; and a pupillary distance value corresponding to a target 3D picture corresponding to the target picture indication is determined based on the target 3D picture.

In this implementation, during acquisition of the pupillary distance value, the visual training instrument switches between 3D pictures (binocular pictures) corresponding to different pupillary distance values, and the user selects a 3D picture that looks most comfortable (generally, a group of pictures that look most stereoscopic or that have the strongest stereoscopic sense). At this time, a pupillary distance value is determined based on a matching relationship between 3D pictures and pupillary distance values. A pupillary distance measurement method is implemented via software. Compared with a hardware-based measurement solution, the software-based pupillary distance measurement method reduces hardware investment and costs. In addition, when using this method, a user does not need to learn about hardware used in the hardware-based measurement solution, such that this method is applicable to common users, a measurement learning cost is low and a measurement period is short.

In a second manner, the pupillary distance value measured by a pupillary distance measuring instrument is acquired.

The solution is a hardware-based measurement solution. For example, the visual training instrument is equipped with an infrared camera-based eye-tracking apparatus, and can shoot an eye image of the user by using an infrared camera, and acquire the pupillary distance value by performing algorithm analysis on the eye image.

In step 202, a pupillary distance change flag is set based on a pupillary distance value acquired this time and a pupillary distance value acquired last time.

The pupillary distance change flag is set in the visual training instrument and is configured to indicate whether the pupillary distance value changes. Generally, in the case that the pupillary distance value changes, an object-image relationship required for an anti-distortion algorithm needs to be re-determined; and in the case that the pupillary distance value does not change, an object-image relationship used last time may be used to make an image processing flow more concise.

Figure 19:
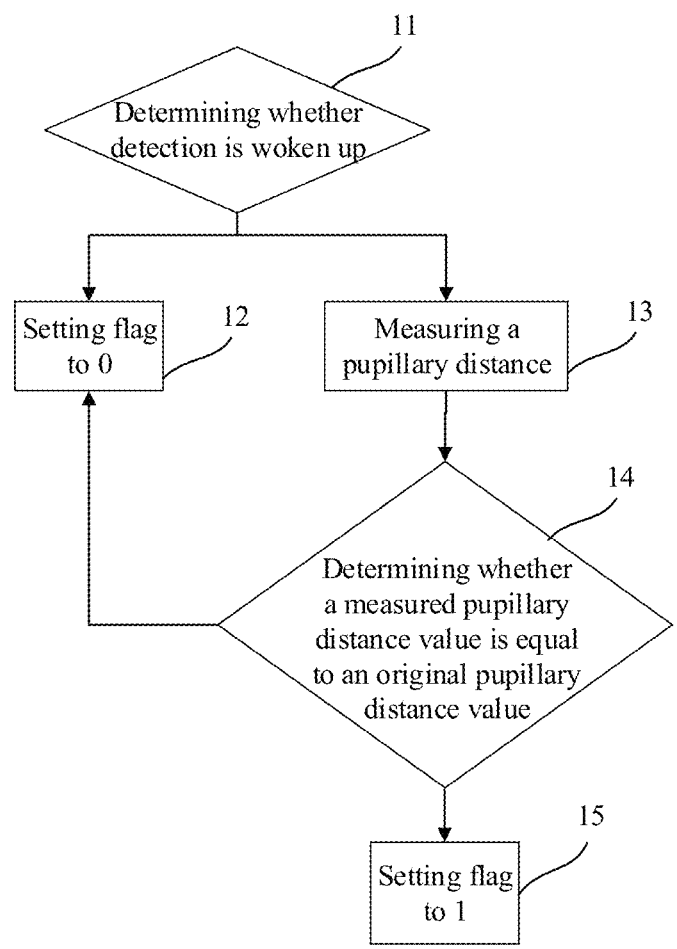
FIG. 19 is a flowchart of setting a pupillary distance change flag according to an embodiment of the present disclosure.

FIG. 19 is a flowchart of setting a pupillary distance change flag according to an embodiment of the present disclosure. Referring to FIG. 19, activating pupillary distance measurement in a wakeup fashion is used as an example in step 201. In step 11, whether a pupillary distance detection process is woken up is detected first; in the case that the pupillary distance detection process is not woken up, step 12 is performed to set a pupillary distance change flag to 0; in the case that the pupillary distance detection process is woken up, step 13 is performed to measure a pupillary distance (steps 11 and 13 herein constitute the foregoing step 201); in step 14, whether a measured pupillary distance value is equal to an original pupillary distance value is determined; and in the case that the measured pupillary distance value is not equal to the original pupillary distance value, step 15 is performed to set the pupillary distance change flag to 1; or in the case that the measured pupillary distance value is equal to the original pupillary distance value, step 12 is performed to set the pupillary distance change flag to 0.

When the pupillary distance change flag is 0, there may be the following cases. Firstly, the pupillary distance measurement is completed, and the measured pupillary distance value is equal to the original pupillary distance value. Secondly, the pupillary distance measurement is uncompleted (For example, the user does not wake up a pupillary distance measurement process, or the user does not input a target picture indication.) Thirdly, the method for processing images is started in the visual training instrument for the first time, and the pupillary distance measurement is not performed yet.

In step 203, a pupillary distance change flag is acquired. In the case that the pupillary distance change flag indicates that the pupillary distance value changes, perform step 204. In the case that the pupillary distance change identifier indicates that the pupillary distance value does not change, perform step 205.

Exemplarily, the pupillary distance change flag may be represented by a binary number. For example, in the case that the pupillary distance change flag is 0, it indicates that the pupillary distance value does not change; and in the case that the pupillary distance change flag is 1, it indicates that the pupillary distance value changes.

For example, the pupillary distance change flag is acquired before each frame of the picture is displayed. Therefore, whether the pupillary distance value changes can be found in time. Each frame of rendering is performed based on receives the latest pupillary distance value via real-time tracking of whether a pupillary distance measurement application updates the pupillary distance value; and the latest object-image relationship is determined in real time, such that accuracy of an image acquired after rendering can be ensured, that is, each frame of image rendering is performed based on the latest field of view (FOV).

In step 204, an object-image relationship to which a changed pupillary distance value and the object distance of the near-eye display device correspond is determined based on a correspondence.

The correspondence is a correspondence among a pupillary distance, an object distance, and an object-image relationship; in the correspondence, one pupillary distance corresponds to one group of object-image relationships; and the group of object-image relationships includes a plurality of object-image relationships corresponding to different object distances.

Object-image relationships between various pupillary distances and object distances may be stored in the visual training instrument in advance. Therefore, during image processing, it only needs to select a corresponding object-image relationship from these stored object-image relationships for use. In other words, the method may further include: acquiring a correspondence among a pupillary distance, an object distance, and an object-image relationship; and storing the correspondence into a storage unit of the near-eye display device.

The correspondence among the pupillary distance, the object distance, and the object-image relationship may be stored in the visual training instrument in a form of a table.

For example, the correspondence among the pupillary distance, the object distance, and the object-image relationship may be shown in table 1.

TABLE 1

| Pupillary distance | Object distance | Object-image relationship |
|---|---|---|
| Pupillary distance value 1 | Object distance 1 | Object-image relationship 1 |
|  | Object distance 2 | Object-image relationship 2 |
|  | ... | ... |
|  | Object distance n | Object-image relationship 3 |
| Pupillary distance value 2 | Object distance 1 | Object-image relationship 4 |
|  | Object distance 2 | Object-image relationship 5 |
|  | ... | ... |
|  | Object distance n | Object-image relationship 6 |
| Pupillary distance value n | Object distance 1 | Object-image relationship 7 |
|  | Object distance 2 | Object-image relationship 8 |
|  | ... | ... |
|  | Object distance n | Object-image relationship n |

It should be noted that, when the above correspondence is acquired and stored, user's pupillary distance values may be collected first, then distribution status of a plurality of user's pupillary distance values is determined, and a pupillary distance value in a user distribution set for measurement is selected to determine a correspondence, thereby accumulating data for subsequent target customer group-oriented device design.

Acquiring the correspondence among the pupillary distance, the object distance, and the object-image relationship includes: acquiring the correspondence among the pupillary distance, the object distance, and the object-image relationship by respectively determining, for different pupillary distances and object distances, the correspondence between the coordinates of the locating point on the screen and the coordinates of the field of view of the image point displayed at the locating point.

In the field of VR, a system field of view (hereinafter referred to as field of view for short) is determined based on an optical parameter of a lens as well as a position relationship between a screen and a lens. A lens parameter of a VR device may be directly acquired from optical structure information of the VR device. The position relationship between a screen and a lens may be determined based on an object distance and a pupillary distance. Coordinates of the field of view can be determined based on the above parameters. After the coordinates of the field of view are acquired, the correspondence between the coordinates of the locating point on the screen and the coordinates of the field of view of the image point displayed at the locating point may be further acquired based on the coordinates of the field of view and the lens parameter of the VR device (which may also be acquired from the optical structure information). The above optical structure information may be acquired from helmet micro display (HMD) information. The HMD information generally includes a display resolution, structure parameters such as a pupillary distance, optical structure information, and the like.

Figure 20:
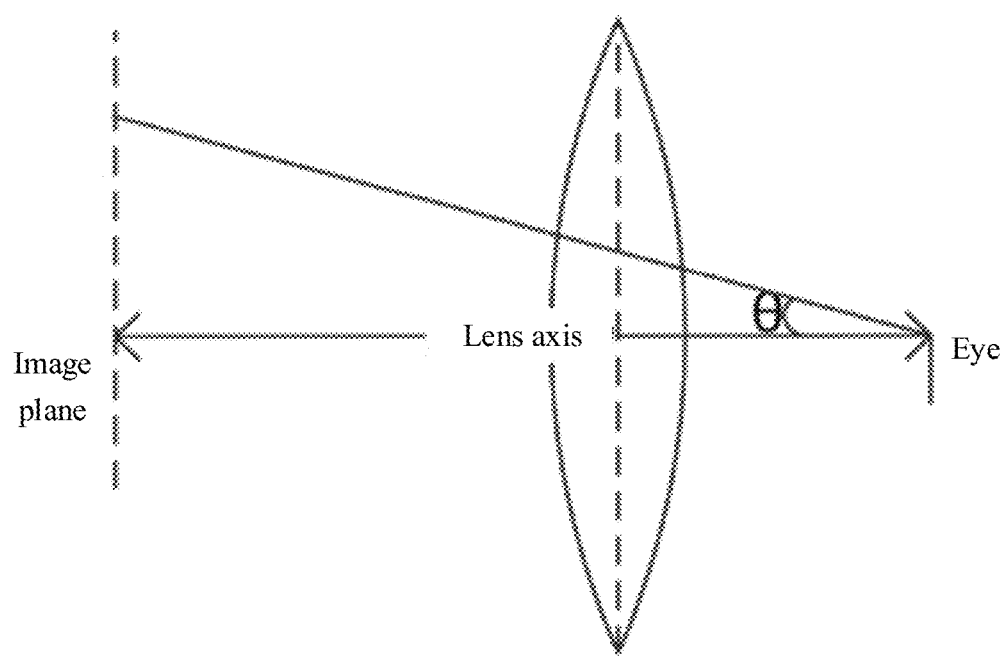
FIG. 20 is a schematic diagram of defining coordinates of a field of view.
Figure 21:
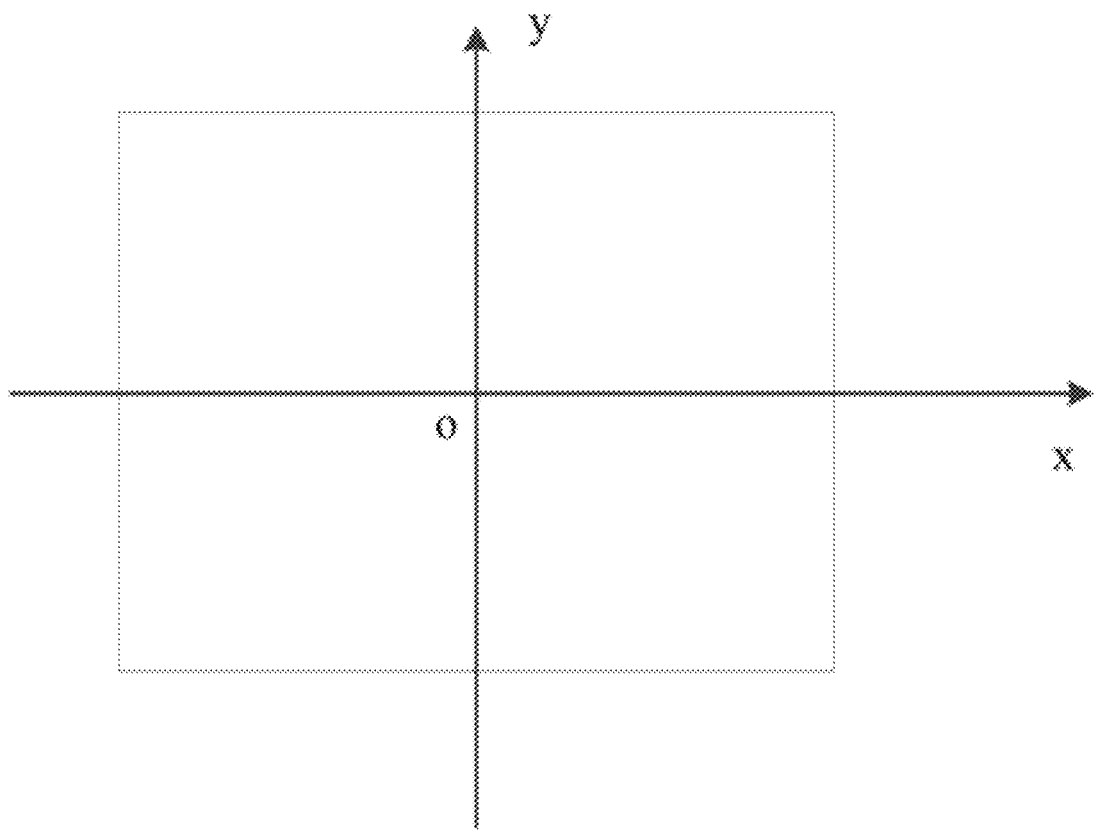
FIG. 21 is a schematic diagram of defining coordinates of a locating point on a screen.

FIG. 20 and FIG. 21 respectively show schematic diagrams of defining coordinates of a field of view and coordinates of a locating point on a screen. Referring to FIG. 20, the coordinates of the field of view are within a coordinate system that takes a center of a lens as an origin, takes a rightward direction of a user wearing a VR helmet as an x axis, and takes a upward direction of the user wearing the VR helmet as a y axis. In FIG. 20, an included angle θ between an optical axis and a connection line between an image point and a viewpoint represents the field of view, that is, the coordinates of the field of view are (θx, θy). Referring to FIG. 21, the coordinates of the locating point on the screen are within a coordinate system that takes an intersection O of the screen and a primary optical axis of the lens as an origin, takes a left-right direction of the screen as an x axis, and takes an up-down direction of the screen as a y axis, that is, the coordinates of the locating point on the screen are (x, y).

In this embodiment of the present disclosure, step 204 may include:
  determining, based on the pupillary distance value, a group of object-image relationships corresponding to the pupillary distance value; and
  selecting an object-image relationship corresponding to the object distance of the near-eye display device from the group of object-image relationships.

Exemplarily, although the visual training instrument stores object-image relationships corresponding to various object distances, these object distances are discretely distributed but not contiguous. Therefore, no object distance in the stored object-image relationships is completely identical to a determined object distance. In this case, an object-image relationship corresponding to an object distance that is most identical to the object distance of the near-eye display device may be selected as the object-image relationship.

Optionally, the method may further include: storing the object-image relationship determined in step 204, such that an object-image relationship that is used last time can be acquired in a subsequent image processing flow.

In step 205, an object-image relationship corresponding to the object distance of the near-eye display device is selected from a group of object-image relationships that is used last time.

As described above, the visual training instrument may store a group of object-image relationships that corresponds to a pupillary distance and is acquired each time. In this way, when the pupillary distance value does not change, a group of object-image relationships that is determined last time can be used directly, instead of re-determining an object-image relationship, which can save computing resources and time for processing images.

In step 206, a rendering resolution is determined.

Generally, a rendering resolution is related to a display resolution, and is greater than the display resolution, thereby ensuring that an image acquired after rendering can satisfy requirements of the display resolution. For example, there may be a correspondence between the rendering resolution and the display resolution, and the rendering resolution can be determined based on a display resolution required by the visual training instrument. Besides, in addition to the display resolution, the rendering resolution further needs to consider performance of a graphic processing card, details of which are not described herein.

In step 207, user pose information is acquired.

In VR technology, the user pose information mainly includes a posture of a user, an orientation of the user, and the like. These parameters impact a scene that may be seen by a user, thereby determining a 3D picture to be displayed currently.

Exemplarily, the user pose information may be detected by sensors in the visual training instrument. These sensors herein include but are not limited to a gyroscope, a geomagnetic sensor, an acceleration sensor, and the like.

In step 208, a to-be-displayed picture is acquired by performing 3D picture rendering according to the rendering resolution based on the user pose information.

After the user pose information and the rendering resolution are determined, 3D picture rendering is performed according to VR technology. Details about a rendering process are not described herein.

In step 209, anti-distortion processing is performed on the to-be-displayed picture.

In this embodiment of the present disclosure, a plurality of anti-distortion algorithms may be preset in the visual training instrument, and an anti-distortion algorithm may be selected before the anti-distortion processing is performed.

Exemplarily, the anti-distortion algorithms may be classified based on distortion types, such as anti-distortion algorithms corresponding to pincushion distortion, and anti-distortion algorithms corresponding to barrel distortion. Alternatively, the anti-distortion algorithms may be classified based on processing modes, such as grid-based anti-distortion algorithms, and vertex-based anti-distortion algorithms.

For example, different anti-distortion algorithms may be associated with pupillary distance values, and different anti-distortion algorithms correspond to different pupillary distance values. In this case, step 209 may include:

determining an anti-distortion algorithm based on the pupillary distance value, and performing the anti-distortion processing on the to-be-displayed picture by using the object-image relationship as an input parameter of the anti-distortion algorithm.

Taking the grid-based anti-distortion algorithm as an example, the anti-distortion processing mode may be performed as follows.

Firstly, an image is divided into a plurality of regions.

Secondly, image coordinates of a vertex of each region are determined. The image coordinates herein may be coordinates in a planar coordinate system on an image plane.

Thirdly, the image coordinates of the vertex of each region are converted into screen coordinates according to an object-image relationship.

Because the object-image relationship actually describes a mapping relationship between an image and a locating point on a screen, and there is a position relationship between the vertex of each region in the planar coordinate system on the image plane and an image point corresponding to the locating point. Other points in the image can also be mapped onto the screen based on the mapping relationship and the position relationship, thereby acquiring the screen coordinates corresponding to the image coordinates of the vertex of each region.

Fourthly, the screen coordinates are converted into pixel coordinates corresponding to a screen of a VR device, namely, coordinates of a midpoint of an anti-distortion grid, based on optical structure information (a parameter of a lens, a position relationship between the lens and the screen, and the like) of the VR device.

For example, a point in a picture is originally displayed at point A (screen coordinates) on the screen, but to ensure that the user can see the picture normally without distortion, this point needs to be displayed at point B (pixel coordinates) on the screen.

Fifthly, an anti-distortion grid determined according to the above four steps still has only some points. In this case, a complete anti-distortion grid having shape similarity to the anti-distortion grid having only some points may be selected from a plurality of pre-stored complete anti-distortion grids; or a complete anti-distortion grid may be acquired by performing interpolation and polynomial solution on the anti-distortion grid having only some points.

Herein, the shape similarity may mean that outer contours of the two anti-distortion grids are most similar to each other.

Sixthly, a picture is acquired by using a rendered scene as texture and pasting the rendered scene to the anti-distortion grid. The picture may be stored in a frame buffer to be output and displayed.

In step 210, a picture acquired after the anti-distortion processing is output.

In other words, the picture acquired after the anti-distortion processing is output to a screen of the visual training instrument for displaying.

Figure 22:
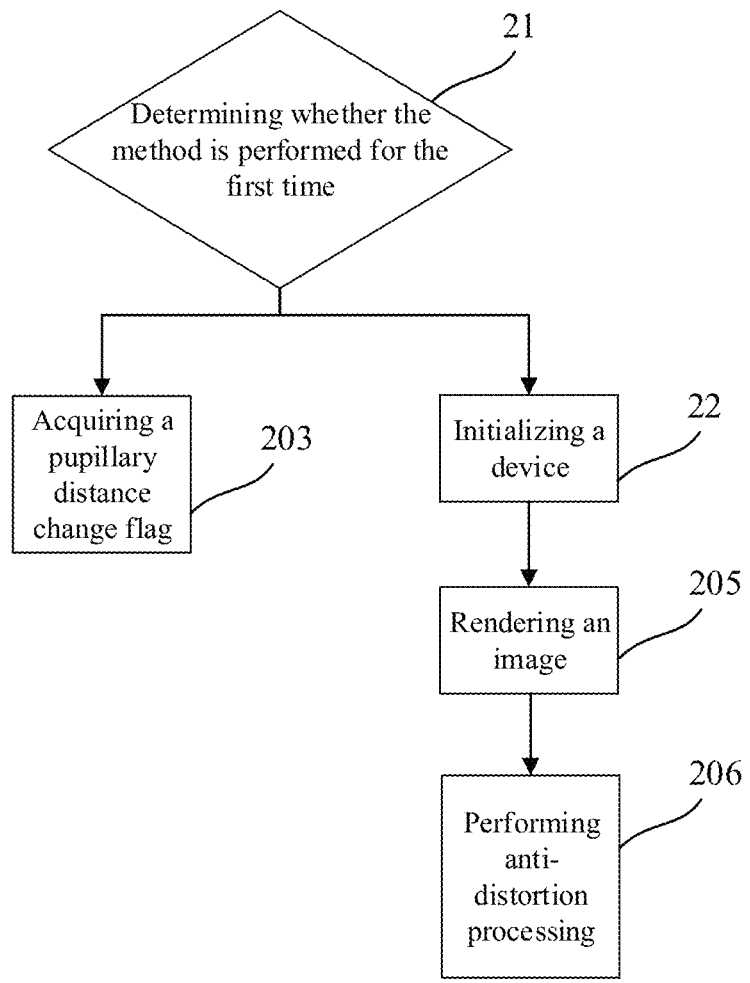
FIG. 22 is a flowchart of initializing a visual training instrument according to an embodiment of the present disclosure.

The above steps 201 to 210 constitute a method flow performed in a use process of the visual training instrument. However, for a visual training instrument that is started for the first time, performing steps 201 to 205 may be skipped, and parameters related to anti-distortion are acquired via an initialization process. FIG. 22 is a flowchart of initializing a visual training instrument according to an embodiment of the present disclosure. As shown in FIG. 22, when the visual training instrument performs the method for processing images, whether the method for processing images is performed for the first time is determined in step 21. In the cases that the method is performed for the first time, step 22 is performed for device initialization. An initialization process includes acquiring initial parameters such as an anti-distortion parameter, a display resolution, a device optical parameter, and the like. After the initialization, processes such as image rendering and anti-distortion processing, namely, steps 206 and 207, may be performed based on the above parameters. In the case that the method is not performed for the first time, step 203 is performed.

Figure 23:
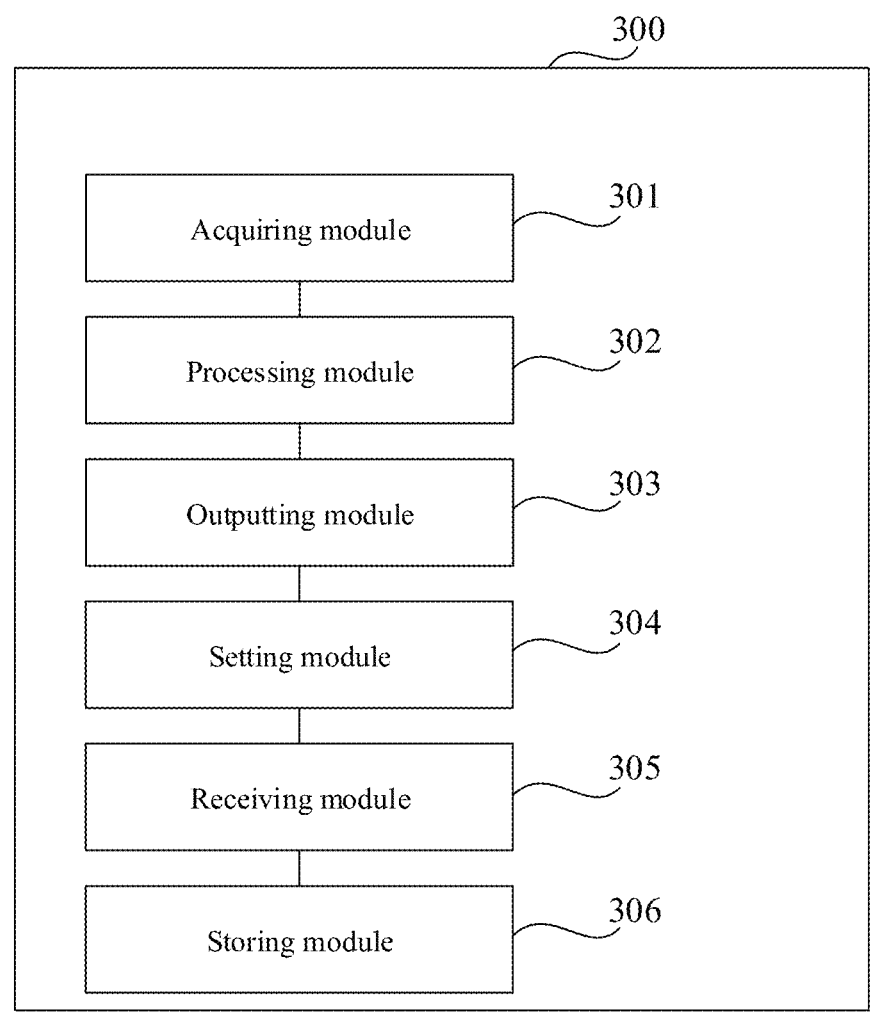
FIG. 23 is a block diagram of an apparatus for processing images according to an embodiment of the present disclosure.

FIG. 23 is a block diagram of an apparatus 300 for processing images according to an embodiment of the present disclosure. As shown in FIG. 23, the apparatus 300 for processing images includes an acquiring module 301, a processing module 302, and an outputting module 303.

The acquiring module 301 is configured to acquire an object-image relationship to which both a pupillary distance value of a near-eye display device and an object distance of the near-eye display device correspond, wherein the object-image relationship includes a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen.

The processing module 302 is configured to perform anti-distortion processing on a to-be-displayed picture based on the object-image relationship.

The outputting module 303 is configured to output a picture acquired after the anti-distortion processing.

Optionally, the acquiring module 301 is configured to: in the case that the pupillary distance value changes, determine, based on a correspondence, an object-image relationship to which a changed pupillary distance value and the object distance of the near-eye display device correspond, wherein the correspondence is a correspondence among a pupillary distance, an object distance, and an object-image relationship; in the correspondence, one pupillary distance corresponds to one group of object-image relationships; and the group of object-image relationships includes a plurality of object-image relationships corresponding to different object distances; or in the case that the pupillary distance value does not change, select an object-image relationship corresponding to the object distance of the near-eye display device from a group of object-image relationships that is used last time.

Optionally, the acquiring module 301 is further configured to acquire a pupillary distance change flag, wherein the pupillary distance change flag is configured to indicate whether the pupillary distance value changes.

Optionally, the acquiring module 301 is configured to acquire the pupillary distance change flag before each frame of the picture is displayed.

Optionally, the acquiring module 301 is configured to determine, based on the pupillary distance value, a group of object-image relationships corresponding to the pupillary distance value; and select an object-image relationship corresponding to the object distance of the near-eye display device from the group of object-image relationships.

Optionally, the acquiring module 301 is further configured to periodically acquire the pupillary distance value; and the apparatus further includes a setting module 304, configured to set the pupillary distance change flag based on a pupillary distance value acquired this time and a pupillary distance value acquired last time.

Optionally, the acquiring module 301 is configured to sequentially display a plurality of 3D pictures to a user, wherein the plurality of 3D pictures are 3D pictures applicable to different pupillary distance values; receive a target picture indication input by the user based on the plurality of 3D pictures; and determine, based on a target 3D picture corresponding to the target picture indication, a pupillary distance value corresponding to the target 3D picture.

Optionally, the acquiring module 301 is further configured to acquire the pupillary distance value measured by a pupillary distance measuring instrument.

Optionally, the apparatus further includes a receiving module 305, configured to receive a wake-up instruction;

the acquiring module 301 is configured to acquire the pupillary distance value after receiving the wake-up instruction; and the setting module 304 is configured to set the pupillary distance change flag based on a pupillary distance value acquired this time and a pupillary distance value acquired last time.

Optionally, the processing module 302 is configured to determine an anti-distortion algorithm based on the pupillary distance value; and perform the anti-distortion processing on the to-be-displayed picture by using the object-image relationship as an input parameter of the anti-distortion algorithm.

Optionally, the processing module 302 is configured to determine a rendering resolution before performing the anti-distortion processing on the to-be-displayed picture based on the object-image relationship; acquire user pose information; and acquire the to-be-displayed picture by performing 3D picture rendering according to the rendering resolution based on the user pose information.

Optionally, the acquiring module 301 is further configured to acquire a correspondence among a pupillary distance, an object distance, and an object-image relationship.

The apparatus further includes a storing module 306, configured to store the correspondence into a storage unit of the near-eye display device.

Optionally, the acquiring module 301 is further configured to acquire the correspondence among the pupillary distance, the object distance, and the object-image relationship by respectively determining, for different pupillary distances and object distances, the correspondence between the coordinates of the locating point on the screen and the coordinates of the field of view of the image point displayed at the locating point.

It should be noted that division of all of the above functional modules of the apparatus for processing images according to the embodiments of the present disclosure is described only as an example when the apparatus processes images. In practice, the above functions may be completed by different functional modules as required. In other words, an internal structure of the apparatus may be divided into different functional modules to complete all or part of the functions described above. In addition, the apparatus for processing images according to the above embodiments is based on the same concept as the embodiments of the method for processing images. Details about an implementation process of the apparatus refer to the method embodiments, which are not described herein again.

Figure 24:
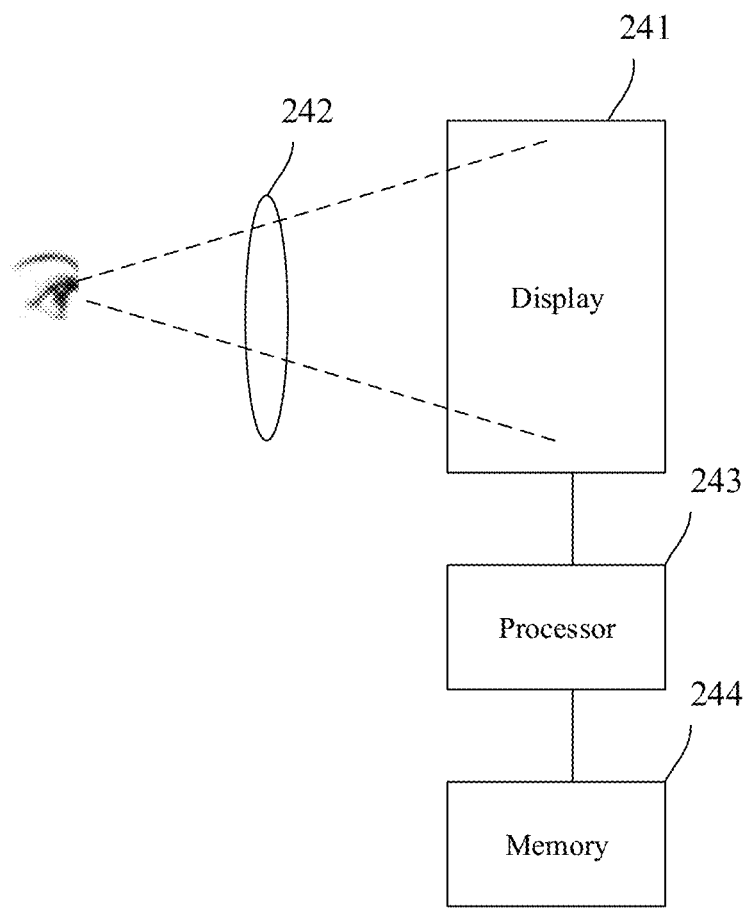
FIG. 24 is a schematic structural diagram of a near-eye display device according to an embodiment of the present disclosure.

FIG. 24 is a schematic structural diagram of a near-eye display device according to an embodiment of the present disclosure. As shown in FIG. 24, the near-eye display device includes a display 241, lenses 242, a processor 243, and a memory 244.

The memory 244 is configured to store a computer program.

The processor 243 is configured to execute the computer program stored in the memory 244, to perform the foregoing methods for processing images.

The display 241 is configured to display a picture output by the processor 243 and acquired after the anti-distortion processing.

The lenses 242 are disposed on a side where a light-emitting surface of the display 241 is located and opposite to the display 241, that is, between the display 241 and viewpoints.

The display 241 may include screens corresponding to a left eye and a right eye. The lenses 242 include lenses corresponding to the left eye and the right eye. The lenses 242 are disposed between the viewpoints and the screens.

The near-eye display device may further include a display card, configured to render an image.

The near-eye display device may further include an object distance adjustment unit configured to adjust distances between the lenses and the screens, and a pupillary distance adjustment unit configured to adjust a distance between the two lenses.

The near-eye display device may further include a lens mounting part, a screen mounting part, and the like, such that a dismountable and modularized near-eye display device is realized.

Figure 25:
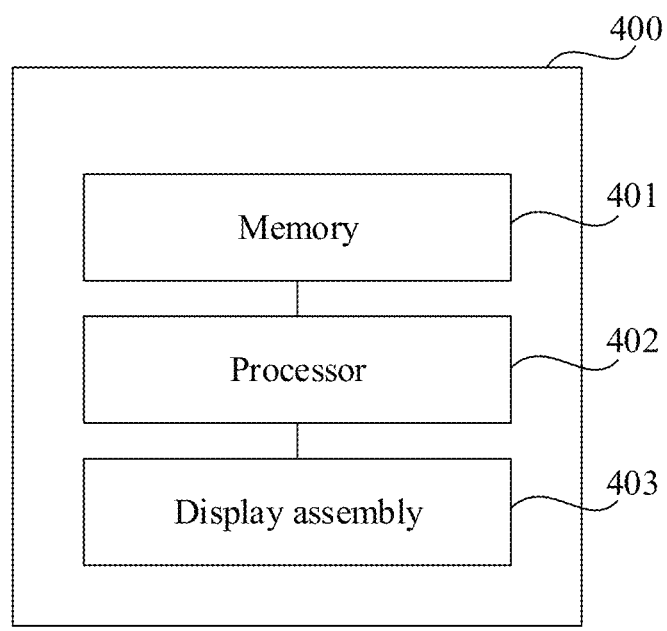
FIG. 25 is a schematic structural diagram of a computer device according to an embodiment of the present disclosure.

As shown in FIG. 25, an embodiment of the present disclosure further provides a computer device 400. The computer device 400 may be a VR-based visual training instrument, or another VR that needs to perform anti-distortion processing. The computer device 400 may be configured to perform the method for processing images according to the above embodiments. Referring to FIG. 25, the computer device 400 includes a memory 401, a processor 402, and a display assembly 403. Those skilled in the art may understand that the structure of the computer device 400 shown in FIG. 25 does not constitute a limitation to the computer device 400. In practice, the computer device 400 may include more or fewer assemblies than those shown in the figure, or a combination of some assemblies, or an arrangement of different assemblies.

The memory 401 may be configured to store a computer program and a module, and may mainly include a program storage region and a data storage region. The program storage region may store an operating system, an application required by at least one function, and the like. The memory 401 may include a high-speed random-access memory, and may further include a non-volatile memory, for example, at least one disk storage device, a flash memory, or another volatile solid-state storage device. Correspondingly, the memory 401 may further include a memory controller, such that the processor 402 can access to the memory 401.

The processor 402 executes various functional applications and processes data by running software programs and modules stored in the memory 401.

The display assembly 403 is configured to display an image, and may include a display panel. Optionally, the display panel may be configured in a form of a liquid crystal display (LCD), an organic light-emitting diode (OLED), or the like.

In an exemplary embodiment, a computer-readable storage medium is further provided. The computer-readable storage medium is a non-volatile storage medium. The computer-readable storage medium stores a computer program. The computer program stored in the computer-readable storage medium, when executed by a processor, causes the processor to perform the method for processing images according to the embodiments of the present disclosure.

In an exemplary embodiment, a computer program product is further provided. The computer program product stores an instruction. The instruction, when run on a computer, enables the computer to perform the method for processing images according to the embodiments of the present disclosure.

In an exemplary embodiment, a chip is further provided. The chip includes a programmable logic circuit and/or a program instruction. The chip, when run, can perform the method for processing images according to the embodiments of the present disclosure.

Those of ordinary skill in the art can understand that some or all steps of the above embodiments may be implemented by hardware or by a program controlling related hardware. The program may be stored in a computer-readable storage medium. The storage medium may be a read-only memory, a magnetic disk, a compact disc, or the like.

The above descriptions are merely optional embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A method for processing images, comprising:
acquiring an object-image relationship to which both a pupillary distance value of a near-eye display device and an object distance of the near-eye display device correspond, wherein the object-image relationship comprises a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen;
performing anti-distortion processing on a to-be-displayed picture based on the object-image relationship; and
outputting a picture acquired after the anti-distortion processing.

2. The method according to claim 1, wherein acquiring the object-image relationship to which both the pupillary distance value of the near-eye display device and the object distance of the near-eye display device correspond comprises:
in the case that the pupillary distance value changes, determining, based on a correspondence, an object-image relationship to which a changed pupillary distance value and the object distance of the near-eye display device correspond, wherein the correspondence is a correspondence among a pupillary distance, an object distance, and an object-image relationship; in the correspondence, one pupillary distance corresponds to one group of object-image relationships; and the group of object-image relationships comprises a plurality of object-image relationships corresponding to different object distances; or
in the case that the pupillary distance value does not change, selecting an object-image relationship corresponding to the object distance of the near-eye display device from a group of object-image relationships that is used last time.

3. The method according to claim 2, further comprising: acquiring a pupillary distance change flag, wherein the pupillary distance change flag is configured to indicate whether the pupillary distance value changes.

4. The method according to claim 3, wherein acquiring the pupillary distance change flag comprises:
acquiring, before each frame of the picture is displayed, the pupillary distance change flag.

5. The method according to claim 4, wherein determining, based on the correspondence, the object-image relationship to which the changed pupillary distance value and the object distance of the near-eye display device correspond comprises:
determining, based on the pupillary distance value, a group of object-image relationships corresponding to the pupillary distance value; and
selecting an object-image relationship corresponding to the object distance of the near-eye display device from the group of object-image relationships.

6. The method according to claim 4, further comprising: periodically acquiring the pupillary distance value; and
setting a pupillary distance change flag based on a pupillary distance value acquired this time and a pupillary distance value acquired last time.

7. The method according to claim 4, further comprising: acquiring the pupillary distance value after receiving a wake-up instruction; and
setting a pupillary distance change flag based on a pupillary distance value acquired this time and a pupillary distance value acquired last time.

8. The method according to claim 3, wherein determining, based on the correspondence, the object-image relationship to which the changed pupillary distance value and the object distance of the near-eye display device correspond comprises:
determining, based on the pupillary distance value, a group of object-image relationships corresponding to the pupillary distance value; and
selecting an object-image relationship corresponding to the object distance of the near-eye display device from the group of object-image relationships.

9. The method according to claim 3, further comprising: periodically acquiring the pupillary distance value; and
setting a pupillary distance change flag based on a pupillary distance value acquired this time and a pupillary distance value acquired last time.

10. The method according to claim 3, further comprising: acquiring the pupillary distance value after receiving a wake-up instruction; and
setting a pupillary distance change flag based on a pupillary distance value acquired this time and a pupillary distance value acquired last time.

11. The method according to claim 2, wherein determining, based on the correspondence, the object-image relationship to which the changed pupillary distance value and the object distance of the near-eye display device correspond comprises:
determining, based on the pupillary distance value, a group of object-image relationships corresponding to the pupillary distance value; and
selecting an object-image relationship corresponding to the object distance of the near-eye display device from the group of object-image relationships.

12. The method according to claim 2, further comprising: periodically acquiring the pupillary distance value; and
setting a pupillary distance change flag based on a pupillary distance value acquired this time and a pupillary distance value acquired last time.

13. The method according to claim 12, wherein acquiring the pupillary distance value each time in a process of periodically acquiring the pupillary distance value comprises:
sequentially displaying a plurality of 3D pictures to a user, wherein the plurality of 3D pictures are 3D pictures applicable to different pupillary distance values;
receiving a target picture indication input by the user based on the plurality of 3D pictures; and
determining, based on a target 3D picture corresponding to the target picture indication, a pupillary distance value corresponding to the target 3D picture.

14. The method according to claim 12, wherein acquiring the pupillary distance value each time in a process of periodically acquiring the pupillary distance value comprises:
acquiring the pupillary distance value measured by a pupillary distance measuring instrument.

15. The method according to claim 2, further comprising: acquiring the pupillary distance value after receiving a wake-up instruction; and
setting a pupillary distance change flag based on a pupillary distance value acquired this time and a pupillary distance value acquired last time.

16. The method according to claim 1, wherein performing the anti-distortion processing on the to-be-displayed picture based on the object-image relationship comprises:
determining an anti-distortion algorithm based on the pupillary distance value; and
performing the anti-distortion processing on the to-be-displayed picture by using the object-image relationship as an input parameter of the anti-distortion algorithm.

17. The method according to claim 1, wherein the near-eye display device is a visual training instrument.

18. A near-eye display device, comprising:
a memory, configured to store a computer program;
a display, configured to display a picture output by the processor and acquired after the anti-distortion processing;
a lens, disposed on a side where a light-emitting surface of the display is located and opposite to the display; and
a processor, configured to execute the computer program stored in the memory, to perform a method for processing images comprising:
acquiring an object-image relationship to which both a pupillary distance value of a near-eye display device and an object distance of the near-eye display device correspond, wherein the object-image relationship comprises a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen;

performing anti-distortion processing on a to-be-displayed picture based on the object-image relationship; and outputting a picture acquired after the anti-distortion processing.

19. A computer device, comprising a processor and a memory, wherein the memory is configured to store a computer program; and the processor is configured to execute the computer program stored in the memory, to perform a method for processing images comprising:

acquiring an object-image relationship to which both a pupillary distance value of a near-eye display device and an object distance of the near-eye display device correspond, wherein the object-image relationship comprises a correspondence between coordinates of a locating point on a screen and coordinates of a field of view of an image point displayed at the locating point; the coordinates of the locating point on the screen are coordinates of the locating point in a planar coordinate system using an intersection between a primary optical axis of a lens of the near-eye display device and the screen as an origin; the coordinates of the field of view of the image point displayed at the locating point are an included angle between a connection line between the image point and a viewpoint and a connection line between the origin and the viewpoint; and one coordinate axis of the planar coordinate system is a horizontal axis parallel to the screen, and the other coordinate axis of the planar coordinate is a vertical axis parallel to the screen;

performing anti-distortion processing on a to-be-displayed picture based on the object-image relationship; and outputting a picture acquired after the anti-distortion processing.

20. A non-transitory computer-readable storage medium storing a computer instruction therein, wherein the instruction, when executed by a processor, causes the processor to perform the method for processing images as defined in claim 1.

* * * * *